Patented Mar. 21, 1944

2,344,890

UNITED STATES PATENT OFFICE 2,344,890

ISOMERIZATION PROCESS

James M. Whiteley, Jr., Aruba, Dutch West Indies, assignor to Standard Oil Development Company, a corporation of Delaware No Drawing. Application November 22, 1940, Serial No. 366,711

11 Claims. (Cl. 260—683.5)

The present invention relates to a novel process for isomerizing normal hydrocarbons, in particular the straight chain paraffins, to produce branched chain hydrocarbons, in particular the isoparaffins.

Numerous processes have been proposed for converting normal paraffins into isoparaffins. Each of these processes utilizes at least one Friedel-Crafts type catalyst such as, for example, aluminum chloride, aluminum bromide, zinc chloride and the like. Also, to these Friedel-Crafts type catalysts there is added a promoter such as water or hydrogen chloride or hydrogen bromide. More recently it has been discovered that in addition to the promoter it has been found advantageous to carry out these reactions in the presence of considerable quantities of elemental or free hydrogen. So far as known, however, up to the present time no particularly effective catalyst has been found for converting normal paraffins into their corresponding isomeric forms in an efficient manner except by the use of Friedel-Crafts type catalysts.

It has now been discovered that the isomerization of normal or straight chain paraffins to iso or branched chain paraffins may be efficiently carried out by employing a novel isomerization catalyst. It has been discovered that halo sulfonic acids which may be promoted with boron trihalides serve to catalyze the isomerization of normal paraffins to isoparaffins.

It is an object of the present invention to carry out a process of isomerizing normal paraffins to isoparaffins in the presence of at least one halo sulfonic acid. It is a further object of the invention to carry out such a process in the presence of at least one halo sulfonic acid promoted with at least one boron trihalide.

As examples of the materials which may be employed in the composition of the catalyst there may be mentioned chlorsulfonic acid, fluorsulfonic acid an bromsulfonic acid. The catalyst mass may be composed of one of these materials or a mixture of two or more of them. Likewise, the boron trihalide promoter may be either boron trichloride or boron trifluoride, or a mixture of these two halides may be employed as the promoter. In general, it is preferred to use the same halide atom in both the promoter and the catalyst. When employing a boron trihalide promoter, the exact chemical composition of the catalyst is not definitely known at present. The catalyst may be considered as simply a mixture of solution of halo sulfonic acid containing dissolved or admixed boron trihalide. On the other hand, it is quite possible that some chemical reaction occurs between the boron trihalide, such as for example boron trifluoride, and the halo sulfonic acid, such as for example fluorsulfonic acid. If such reaction does occur, it would appear that the ultimate catalyst composition would be the products, both additive and decomposition products, of such a reaction. However, the actual composition of the catalytic mass may in fact simply be an admixture of boron fluoride with fluorsulfonic acid. Regardless of the actual mechanism and theory of the catalyst formation and its exact chemical composition, the invention may be practiced by employing the necessary amount of halo sulfonic acid, adding thereto the desired quantities of fresh feed stock to be isomerized and pressing into the closed reaction chamber, or autoclave, a sufficient quantity of boron trihalide, for example boron trifluoride, in a quantity sufficient to increase the gauge pressure of the autoclave by at least a few pounds per square inch.

On the other hand, it is not necessary to employ a boron trihalide promoter. In such an instance, the halo sulfonic acid, for example fluorsulfonic acid, may be admixed with the hydrocarbon to be isomerized and introduced into the reaction chamber or the feed may be introduced into the chamber and the halo sulfonic acid then added directly to the feed under suitable reaction conditions with vigorous agitation within by reason of the jet dispersions of acid into the feed or by some suitable mechanical means. The halo sulfonic acid is employed from between about 3 and about 100% by volume based on the hydrocarbon present in the reaction zone at any one time. The preferred range is between about 10 and about 50% by volume.

Ordinarily the halo sulfonic acid such as for example fluor- or chlorsulfonic acid employed may be of the commercial grade, i. e., having a purity of upwards of about 95% although lower concentrations may be employed with corresponding reduction in yields of the desired isomers unless the reaction conditions are altered to compensate for the reduced activity of the catalyst. Obviously higher concentrations may be employed such as, for example, 100% fluorsulfonic acid. From a practical standpoint, however, commercial grades are sufficiently concentrated to effect the isomerization with commercial advantage. The commercial halo sulfonic acids usually contain some impurities by reason of their particular method of manufacture, but these impurities appear to be in no way detrimental, in fact, there is some evidence to indicate a beneficial effect in the isomerization by reason of their presence. British Patent Specifications Nos. 479,450 and 496,658 describe suitable methods of producing halo sulfonic acids of commercial grade which are especially suitable for use in the present process. It is likewise within the contemplation of this invention to use not only fluorsulfonic acid as such but to use mixtures of the reactants which produce fluorsulfonic acids, that is, the required amount of sulfur trioxide and hydrogen fluoride in the stoichiometrical quantities necessary may be injected into the feed stock used in this process as, for example, a refinery $C_4$ cut, to produce the desired results of the invention process.

When employing a promoter, no doubt considerable quantities of the boron trifluoride will dissolve in the fluorsulfonic acid, substantial amounts of the boron trifluoride may remain outside of this phase and perhaps tend to promote the isomerization reaction in other ways the specific nature of which is as yet unknown. In introducing the boron trifluoride to the reaction zone of course it is desirable, in order to accurately determine the amount of boron trifluoride introduced, to maintain the autoclave at the desired reaction temperature prior to and during the boron trifluoride addition. On the other hand, if it is desirable to create a considerable autogenous pressure it may be preferable to cool the autoclave containing the fresh feed and fluorsulfonic acid and at this low temperature introduce the desired quantity of boron trifluoride. It then becomes practical to simply raise the temperature of the autoclave to the isomerization temperature, to vigorously agitate the reaction mixture and the pressure developed will be sufficient to carry out the desired results.

The process of the present invention is useful for the isomerization of a large variety of feed stocks. Thus, for example, normal butane, normal pentane, normal hexane, normal heptane, normal octane and the higher straight chain paraffinic homologues, either individually or in admixture with one another, may be employed as feed stocks in the present process. Likewise, field butanes, straight run naphthas, particularly those of predominantly paraffinic nature, and also simple branched chain paraffins which may be isomerized to more highly branched chain paraffins, may be employed. In general, any normal paraffin containing at least four carbon atoms per molecule or any mixture of paraffins predominantly composed of normal paraffins containing at least four carbon atoms per molecule may be employed as satisfactory feed stocks for the present process. Where the feed stock employed is composed of normal paraffins containing at least 6 carbon atoms per molecule or where the feed stock contains substantial amounts of such paraffins, there is a distinct tendency when subjected to the process of the present invention to form in the final product substantial amounts of cracked products of higher and lower molecular weight than the corresponding reactants. In particular, it is noted that these lighter products predominate in branched chain paraffins. Thus, when n-hexane is the feed stock, large quantities of isobutane, isopentane and branched chain hexanes, as well as the branched chain heptanes, are produced. From the standpoint of efficiency of operation, it is desirable to minimize the presence of olefins and aromatics in the feed stock, although traces of these substances may be present in the feed stock without disrupting to any great extent the catalytic activity and the completion of the desired isomerization process.

A temperature range between about 40° F. and about 350° F. is generally employed. It is preferred, however, with the usual type of feed stocks, particularly those of the higher paraffinic series, to employ a temperature between about 75° F. and about 200° F. Within any of the particular temperature ranges, however, it is necessary to correlate not only the temperature with the character of the straight chain paraffin being isomerized but also this reaction condition and reactants with the time of contact of the hydrocarbons with the catalyst mass and with the pressure under which the reaction is maintained. In general, contact times between about one-half hour and about 20 hours are employed. The actual length of residence of the feed in the reaction chamber is, as above stated, correlated with the temperature employed, the catalyst concentration and the nature of the feed entering the reactor. Generally, the preferred time of contact lies between about 1 hour and about 10 hours. It is believed that in general those skilled in the art are capable of working up the actual details of operation, particularly in view of the correlations hereinafter described in the examples. The amount of boron trihalide introduced into the reactor may amount to that quantity indicated by an increase in pressure up to about 500 lbs./sq. in. when the temperature of the reactor is maintained at between about 40° F. and about 350° F. It is in general, however, preferred to operate at a boron trihalide pressure of between about 0 and about 200 lbs./sq. in. Obviously, at the higher pressures and lower reaction temperatures larger amounts of boron trihalides will be dissolved in the halo sulfonic acids. In cases where no positive pressure of boron trihalide is employed, the reaction may be carried out with only sufficient boron trihalide to substantially completely dissolve in the hydrocarbon and/or halo sulfonic acid or no promoter may be added whatsoever. If a desired final total pressure is above that of the autogenous pressure of the reactants, catalysts, and catalyst promoter at the reaction temperature or if the pressure is below that sufficient to maintain liquid phase operations under the reaction conditions, then extraneous pressure may be applied by the use of some gas such as nitrogen, sulfur dioxide, or carbon dioxide.

It has been found desirable to maintain the reaction in the liquid phase and to vigorously agitate the reaction mixture to secure adequate contact of the catalyst composition with the feed stock. The production of high yields of isoparaffins from normal paraffins appears to be favored by an intensive agitation of a liquid phase reaction mixture. Any suitable type of agitating device may be employed, such as for example a turbo mixer, jets of restricted internal diameter, etc.

The unreacted reactants, catalyst, promoter, and heavier and lighter products of the reaction which may be separated from the desired isomeric product and from each other may be returned, either in whole or in part as desired, to the isomerization zone. The desired isomeric products of the reaction may be separated as a hydrocarbon layer from the acid layer in a settler. The hydrocarbon layer may then be neutralized with a suitable alkali, for example caustic soda, and distilled to separate the above-mentioned products.

The desired final products find many uses among which may be mentioned as one of the reactants in aliphatic alkylation reactions, as blending agents in the preparation of aviation gasolines, as feed stocks for catalytic dehydrogenation units, etc. The acid catalyst layer separated from the hydrocarbon layer may be returned to the alkylation reaction.

A continuous as well as a batch type of operation may be carried out in practicing the present invention. In general, for obvious commercial reasons the continuous process is preferred. No special type of apparatus need be employed. The types of apparatus now customarily employed for carrying out polymerization of olefins in the liquid phase, the aliphatic alkylation of isoparaffins with olefins in the liquid phase, and similar types of equipment may be employed. It has been shown that a circulating stream type of process in which only a small portion of that stream is removed from the sphere or zone of reaction at any one time has advantages over some of the other types of equipment. Such a process may be employed in practicing the present invention. A series of reactors, each equipped as described, may be used either in parallel or in series. In a series arrangement various stages of the reaction may be carried out in each reactor under conditions best suited for that particular stage, that is, as to rates of throughput, times of contact, temperatures, amount of catalyst, etc.

After prolonged usage, the fluorsulfonic acid loses its activity to some extent. The partially spent catalyst may be removed from the reaction zone and subjected to any suitable regeneration or reactivation treatment. Such a method comprises heating the spent acid with elemental sulfur or carbon to liberate hydrogen fluoride and either sulfur dioxide or carbon dioxide as the case may be. The hydrogen fluoride is then reunited with sulfur trioxide in accordance with the disclosures of the previously mentioned British patents. To reform fluorsulfonic acid it is advantageous to employ elemental sulfur in preference to elemental carbon for the reason that the resulting sulfur dioxide evolved may be subjected to a conventional catalytic oxidation such as is employed in commercial plants for the manufacture of sulfuric acid by the so-called contact process and the resulting sulfur trioxide may be directly contacted with the hydrogen fluoride for the reformation and restoration of fluorsulfonic acid. Any suitable method of regeneration or reformation is contemplated according to the present invention, however.

As illustrative of the correlation of reaction conditions for carrying out the process of the present invention, the following examples are given. It is not intended that the invention be construed as limited thereto since the examples are illustrative only.

Example 1

An autoclave was charged with 125 cc. of fluorsulfonic acid and 250 cc. of normal pentane. The mixture was agitated and was maintained at a temperature of about 85° C. for a period of about 2 hours. The hydrocarbon layer was withdrawn, neutralized with caustic and distilled. The final product contained about 10% of isopentane and it was found that based on this quantity of isopentane in the final product about 34% of the normal pentane had reacted. The product also contained $C_4$ and lighter hydrocarbons to the extent of about 13% and $C_6$ and heavier hydrocarbons to the extent of about 11%.

Example 2

An autoclave was charged with 1300 cc. of normal pentane and an equal volume of fluorsulfonic acid. The agitated mixture was maintained at a temperature of about 80° C. while boron trifluoride was introduced to give a final pressure under the reaction conditions of about 100 lbs./sq. in. gauge. The mixture was agitated for a period of about 3 hours and at the end of this time the mixture was allowed to settle, the hydrocarbon layer was withdrawn, neutralized with caustic and distilled. It was found that 16% by volume of normal pentane had reacted, of which 44% was converted into isopentane. The formation of $C_4$ and lighter hydrocarbons amounted to about 5% of the final product and of $C_6$ and heavier hydrocarbons to about 4% of the final product.

Example 3

Under conditions similar to those stated in Example 2, except that 1300 cc. of normal butane was employed instead of a like quantity of normal pentane and wherein the reaction mixture was maintained at a temperature of about 200° F., the product contained 36.3% of isobutane, about 8.7% of $C_3$ and lighter hydrocarbons and about 4.3% of $C_5$ and heavier hydrocarbons. About 50.9% of the original normal butane was found to have reacted.

Example 4

In a series of runs carried out in an autoclave which was mechanically agitated during the period of the reaction, boron trifluoride was employed in varying amounts and the time of contact for the reaction was varied. The temperature was maintained at between about 70° F. and about 75° F. and the volume of fluorsulfonic acid employed was about 50% of the amount of normal pentane employed as the feed stock. The following data were obtained:

*Table*

| $BF_3$ in lbs./sq. in. | Time in hrs. | Product | | | Percent n-$C_5$ reacted |
|---|---|---|---|---|---|
| | | $C_4$ | Iso-$C_5$ | $C_6$ | |
| 120 | 3.0 | 22 | 20 | 21 | 63 |
| 195 | 17.5 | 43 | 22 | 22 | 87 |
| 245 | 4.5 | 25 | 18 | 22 | 65 |
| 255 | 2.0 | 14 | 18 | 13 | 45 |
| 410 | 2.0 | 21 | 19 | 19 | 59 |

The $C_4$ fraction includes all decomposition products of the reaction containing 4 or less carbon atoms per molecule; the $C_6$ fraction includes all decomposition products containing 6 or more carbon atoms per molecule.

When used in the specification and claims, the term "halosulfonic acid" or "fluorsulfonic acid" is intended to include not only substantially chemically pure acids but also is intended to include acids of commercial purity. Likewise, these expressions are intended to include compounds or substances which when contacted with one another produce these acids, such as, for example, sulfur trioxide-hydrogen fluoride mixtures. It is also understood that in the description and claims whenever mention is made of a catalyst of boron trihalide and halosulfonic acid such as, for example, boron trifluoride and fluorsulfonic acid, it is intended to include as the catalyst for the reaction any resulting reaction products produced by the interaction of boron trifluoride and fluorsulfonic acid under the process reaction conditions.

Having now thus fully described and illustrated the nature of the invention, what is claimed as new and useful and desired to be secured by Letters Patent is:

1. A process which comprises reacting at least one paraffin containing at least four carbon atoms per molecule under isomerization reaction conditions in contact with a catalyst comprising essentially a member of the group consisting of halosulfonic acids and halosulfonic acids promoted with boron trihalide.

2. A process as in claim 1 wherein the catalyst is at least one halosulfonic acid and at least one boron trihalide is introduced into the reaction mixture under the isomerization reaction conditions.

3. A process which comprises reacting at least one straight chain paraffin containing at least four carbon atoms per molecule under isomerization reaction conditions in contact with a catalyst comprising essentially fluorsulfonic acid.

4. A process as in claim 3 wherein the isomerization reaction is promoted by introducing into the reaction boron trifluoride.

5. A process which comprises isomerizing at least one straight chain paraffin containing at least four carbon atoms per molecule at a temperature between about 40° F. and about 350° F. in contact with a catalyst comprising essentially a substance selected from the group consisting of fluorsulfonic acid and fluorsulfonic acid promoted with boron trifluroide under superatmospheric pressure and correlating the feed stock, temperature, catalyst composition, time of reaction and pressure so as to effectuate a substantial conversion in the liquid phase of straight chain paraffins into branched chain paraffins.

6. A process as in claim 5 wherein the catalyst comprises essentially fluorsulfonic acid promoted with boron trifluoride and wherein the process is carried out continuously.

7. A process which comprises contacting a straight chain paraffinic hydrocarbon containing at least four carbon atoms per molecule at a temperature between about 75° F. and about 200° F. for between about 1 and about 10 hours with agitation while in the liquid phase with fluorsulfonic acid and between about 0 and about 200 lbs./sq. in. of boron trifluoride pressure measured under the reaction conditions and recovering branched chain paraffins from the reacted mixture.

8. A process as in claim 7 wherein the feed stock comprises essentially straight chain paraffins containing at least six carbon atoms per molecule and wherein branched chain isomers and branched chain paraffins of less than six carbon atoms per molecule are recovered from the reacted mixture.

9. A process which comprises contacting normal pentane with about 50% of its volume of fluorsulfonic acid for about 2 hours with vigorous agitation while at a temperature of about 85° F., and recovering isopentane from the reacted mixture.

10. A process which comprises contacting normal butane with an equal volume of fluorsulfonic acid at a temperature of about 200° F. and under a boron trifluoride pressure of about 100 lbs./sq. in. gauge measured under the reaction conditions with agitation for about two hours and recovering isobutane from the reacted mixture.

11. A process which comprises contacting normal pentane with about 50% of its volume of commercial fluorsulfonic acid, maintaining a temperature between about 70° F. and about 75° F., introducing an amount of boron trifluoride sufficient to increase the pressure under the reaction conditions by about 120 lbs./sq. in., agitating the reaction mixture for about 3 hours and recovering branched chain $C_4$ and $C_5$ paraffins from the reacted mixture.

JAMES M. WHITELEY, JR.